US010072551B2

United States Patent
Uchiyama et al.

(10) Patent No.: US 10,072,551 B2
(45) Date of Patent: Sep. 11, 2018

(54) EXHAUST PURIFICATION SYSTEM (71) Applicant: ISUZU MOTORS LIMITED, Tokyo (JP)

(72) Inventors: Tadashi Uchiyama, Kamakura (JP); Hidekazu Fujie, Yamato (JP); Naoto Murasawa, Yamato (JP); Satoshi Hanawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/026,494

(22) PCT Filed: Oct. 8, 2014

(86) PCT No.: PCT/JP2014/076961
§ 371 (c)(1),
(2) Date: Mar. 31, 2016

(87) PCT Pub. No.: WO2015/053322
PCT Pub. Date: Apr. 16, 2015

(65) Prior Publication Data
US 2016/0237872 A1    Aug. 18, 2016

(30) Foreign Application Priority Data
Oct. 8, 2013    (JP) ................. 2013-210699

(51) Int. Cl.
*F01N 3/00*    (2006.01)
*F01N 9/00*    (2006.01)
(Continued)

(52) U.S. Cl.
CPC ........... *F01N 9/002* (2013.01); *F01N 3/0253* (2013.01); *F01N 3/106* (2013.01);
(Continued)

(58) Field of Classification Search
CPC ......... F01N 2560/12; F02D 2200/0812; Y02T 10/47
See application file for complete search history.

(56) References Cited

U.S. PATENT DOCUMENTS

| 8,608,835 B2 * | 12/2013 | Busch ................. F01N 11/002 |
| | | 422/169 |
| 2011/0225954 A1 | 9/2011 | Miyata et al. |
| 2013/0101471 A1 * | 4/2013 | Yacoub ................. F01N 3/103 |
| | | 422/168 |

FOREIGN PATENT DOCUMENTS

| EP | 1916394 | 4/2008 |
| EP | 2 390 480 A1 | 11/2011 |

(Continued)

OTHER PUBLICATIONS

English Machine Translation of JP2010-144630 A.*
(Continued)

*Primary Examiner* — Mark Laurenzi
*Assistant Examiner* — Anthony Ayala Delgado
(74) *Attorney, Agent, or Firm* — Staas & Halsey LLP (57) ABSTRACT

An exhaust purification system includes: a diesel oxidation catalyst (DOC) provided on an exhaust path of an engine; an upstream diesel particulate filter (DPF) and a downstream DPF that are provided on the exhaust path at positions downstream of the DOC to collect particulate matter contained in exhaust gas; electrodes that detect a capacitance of the upstream DPF; a particulate matter accumulation estimating unit that estimates at least an amount of particulate matter accumulated in the downstream DPF on the basis of the capacitance received from the electrodes; and a forced regeneration control unit that injects fuels into the DOC and performs forced regeneration that burns and removes at least the particulate matter accumulated in the downstream DPF (Continued)

when the estimated amount of particulate matter from the particulate matter accumulation estimating unit surpasses a predetermined amount.

4 Claims, 5 Drawing Sheets

(51) Int. Cl.
　　　*F01N 3/10*　　　(2006.01)
　　　*F02D 41/02*　　　(2006.01)
　　　*F01N 3/025*　　　(2006.01)
　　　*F01N 13/00*　　　(2010.01)
　　　*F02D 41/14*　　　(2006.01)
　　　*F02D 41/40*　　　(2006.01)

(52) U.S. Cl.
　　　CPC ..... *F01N 13/0093* (2014.06); *F01N 13/0097* (2014.06); *F01N 13/011* (2014.06); *F02D 41/029* (2013.01); *F02D 41/1466* (2013.01); *F01N 2560/12* (2013.01); *F01N 2900/0601* (2013.01); *F01N 2900/1602* (2013.01); *F01N 2900/1606* (2013.01); *F02D 41/405* (2013.01); *F02D 2200/0804* (2013.01); *F02D 2200/0812* (2013.01); *Y02T 10/47* (2013.01)

(56) References Cited

FOREIGN PATENT DOCUMENTS

| | | |
|---|---|---|
| JP | 2008-8151 | 1/2008 |
| JP | 2009-97410 | 5/2009 |
| JP | 2010-144630 | 7/2010 |
| JP | 2010144630 A * | 7/2010 |
| JP | 2011-179491 | 9/2011 |
| JP | 2011-247145 | 12/2011 |
| WO | 2008/096852 | 8/2008 |

OTHER PUBLICATIONS

Espacenet Bibliographic data, Publication No. 2008-8151, published Jan. 17, 2008.
Espacenet Bibliographic data, Publication No. 2010-144630, published Jul. 1, 2010.
Espacenet Bibliographic data, Publication No. 2011-179491, published Sep. 15, 2011.
Patent Abstracts of Japan, Publication No. 2009-97410, published May 7, 2009.
International Search Report dated Dec. 22, 2014, in corresponding International Application No. PCT/JP2014/076961.
International Preliminary Report on Patentability dated Apr. 12, 2016 in corresponding International Patent Application No. PCT/JP2014/076961.
Extended European Search Report for corresponding European Patent Application No. 14851549.7, dated May 11, 2017.

* cited by examiner

EXHAUST PURIFICATION SYSTEM

CROSS-REFERENCE TO RELATED APPLICATIONS

This application is a U.S. National Stage Application, which claims the benefit under 35 U.S.C. § 371 of PCT International Patent Application No. PCT/JP2014/076961, filed Oct. 8, 2014, which claims the foreign priority benefit under 35 U.S.C. § 119 of Japanese Patent Application No. 2013-210699, filed Oct. 8, 2013, the contents of which are incorporated herein by reference.

TECHNICAL FIELD

The present invention relates to an exhaust purification system, and in particular to an exhaust purification system that includes a filter for collecting particulate matter contained in exhaust gas emitted from an internal combustion engine.

BACKGROUND ART

A diesel particulate filter (hereinafter referred to as "DPF"), for example, is known as a filter for collecting particulate matter (hereinafter referred to as "PM") contained in exhaust gas emitted from a diesel engine.

The DPF can only collect a limited amount of PM. Thus, so-called forced regenerations need to be performed, in which accumulated PM is periodically burned and removed. In a forced regeneration, unburned hydrocarbons (HC) are supplied to a diesel oxidation catalyst (hereinafter referred to as "DOC") on an upstream side in an exhaust gas flowing direction through in-pipe injection (fuel injection into an exhaust pipe) or post-injection to cause oxidation, and to raise the temperature of the exhaust gas to a PM burning temperature.

Known techniques for detecting an amount of accumulated PM collected by a DPF include, for example, a technique of estimating the amount on the basis of a pressure difference across the DPF and a technique of estimating the amount from the electrostatic capacity (capacitance) between electrodes provided in the DPF (e.g., see PATENT LITERATURE DOCUMENTS 1 and 2).

LISTING OF REFERENCES

PATENT LITERATURE DOCUMENT 1: Japanese Patent Application Laid-Open Publication No. 2011-247145
PATENT LITERATURE DOCUMENT 2: Japanese Patent Application Laid-Open Publication No. 2009-97410

The technique of estimating the amount of accumulated PM on the basis of the pressure difference across the DPF, however, faces an issue that the amount of accumulated PM cannot be estimated accurately because the sensitivity drops particularly in an operation range in which the flow rate of the exhaust gas decreases. The technique of estimating the amount from the electrostatic capacity between the electrodes enables the amount of accumulated PM to be estimated without being affected by a running condition of a vehicle or the like. However, the dimensions or the arrangement of the electrodes needs to be decided individually in accordance with the shapes, the pitch, or the like of cells disposed in the DPF. This creates an issue that the technique cannot flexibly deal with the specifications or the like of the DPF.

SUMMARY OF THE INVENTION

The system disclosed herein has an object to detect an amount of accumulated PM in a DPF with high accuracy.

A system disclosed herein includes an oxidation catalyst provided in an exhaust passage of an internal combustion engine; a pair of first and second filters provided in the exhaust passage at a position downstream of the oxidation catalyst to collect particulate matter contained in exhaust gas; an electrostatic capacity detecting unit that detects an electrostatic capacity (capacitance) of the first filter; an accumulation amount estimating unit that estimates an amount of accumulated particulate matter at least in the second filter on the basis of the electrostatic capacity entered from the electrostatic capacity detecting unit; and a filter regenerating unit that executes a forced regeneration to burn and remove the particulate matter that has accumulated at least in the second filter by injecting fuel to the oxidation catalyst when the amount of the accumulated particulate matter entered from the accumulation amount estimating unit exceeds a predetermined amount.

The system disclosed herein can detect an amount of PM accumulated in a DPF with high accuracy.

DETAILED DESCRIPTION

An exhaust purification system according to an embodiment of the present invention will be described with reference to the appended drawings. Identical components are given identical reference numerals and symbols, and their names and functions are identical as well. Therefore, detailed descriptions of such components are not repeated.

Figure 1:
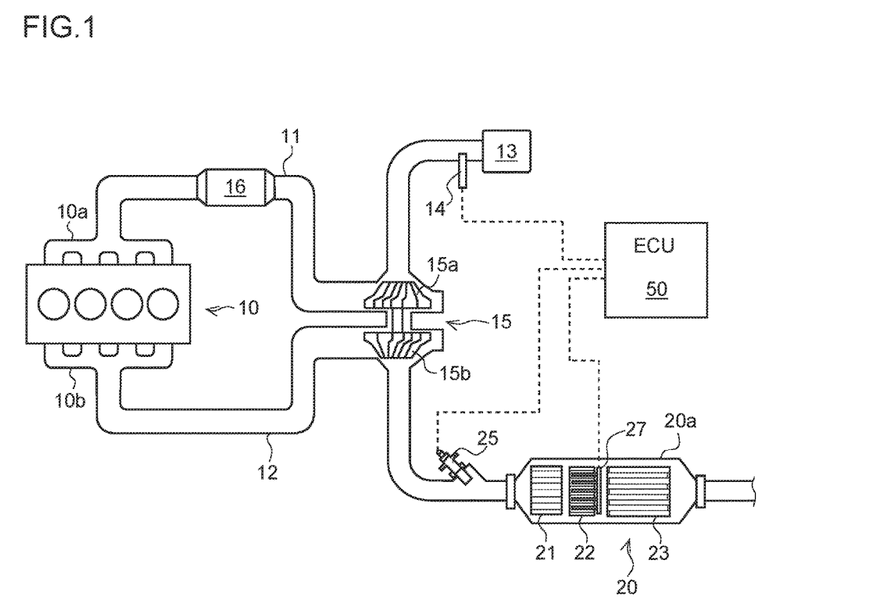
FIG. 1 is an overall configuration diagram schematically illustrating an exhaust purification system according to an embodiment of the present invention.

As illustrated in FIG. 1, a diesel engine (hereinafter simply referred to as "engine") 10 has an intake manifold 10a and an exhaust manifold 10b. An intake passage 11 for introducing fresh air is connected to the intake manifold 10a, and an exhaust passage 12 for discharging the exhaust gas to the atmosphere is connected to the exhaust manifold 10b.

On the intake passage 11, disposed are an air cleaner 13, an mass air flow (MAF) sensor 14, a compressor 15a of a turbo charger 15, an intercooler 16, and so on in this order from the upstream side with respect to an intake air flowing direction. On the exhaust passage 12, disposed are a turbine 15b of the turbo charger 15, an exhaust gas aftertreatment device 20, and so on in this order from the upstream side with respect to an exhaust gas flowing direction.

The exhaust gas aftertreatment device 20 includes a catalyst casing 20a, a DOC 21, an upstream-stage DPF 22 for measurement, and a downstream-stage DPF 23. The DOC 21, the upstream DPF 22 and the downstream DPF 23 are arranged in the catalyst casing 20a in this order from the upstream side with respect to the exhaust gas flowing direction. An in-pipe injection device (device for injecting fuel into the exhaust passage) 25 is provided upstream of the DOC 21.

The in-pipe injection device 25, which constitutes a part of a filter regenerating unit according to the present invention, injects unburned fuel (primarily HC) into the exhaust passage 12 in response to an instruction signal (pulse current) entered from an electronic control unit (hereinafter referred to as "ECU") 50. It should be noted that the in-pipe injection device 25 may be omitted if post-injection by means of multiple-injection of the engine 10 is employed.

The DOC 21 includes a ceramic carrier having, for example, a cordierite honeycomb structure and a catalyst component supported on a surface of the ceramic carrier. The DOC 21 has a number of cells, which are defined by porous partition walls, arranged along the exhaust gas flowing direction. As HC is supplied to the DOC 21 by the in-pipe injection device 25 or through post-injection, the DOC 21 oxidizes the HC to raise the exhaust gas temperature.

The upstream-stage DPF 22 for measurement, which is an example of a first filter according to the present invention, includes a number of cells, which are defined by porous partition walls, arranged along the exhaust gas flowing direction, and is configured to collect the PM contained in the exhaust gas into small cavities in the partition walls or onto their surfaces. The length of the upstream-stage DPF 22 in the exhaust gas flowing direction (i.e., axial direction) is shorter than the length of the downstream-stage DPF 23.

The upstream-stage DPF 22 of this embodiment has a plurality of electrodes 27 that are disposed so as to face each other with at least one or more partition walls interposed therebetween to form a capacitor. The outer peripheral faces of the electrodes 27 are covered with corrosion-resistive insulating layers (not shown). The electrodes 27 are electrically connected to the ECU 50 via an electrostatic capacity detecting circuit (not shown). The electrodes 27 and the electrostatic capacity detecting circuit (not shown) serve as a preferred example of an electrostatic capacity detecting unit according to the present invention.

The downstream-stage DPF 23, which is an example of a second filter according to the present invention, includes a number of cells, which are defined by porous partition walls, arranged along the exhaust gas flowing direction. The upstream sides and the downstream sides of these cells are plugged in an alternating manner. The downstream-stage DPF 23 collects the PM contained in the exhaust gas into the small cavities in the partition walls or onto their surfaces. When an amount of accumulated PM reaches a predetermined amount, a so-called forced regeneration is carried out to the DPF 23, i.e., the accumulated PM in the DPF 23 is burned and removed. In the forced regeneration, unburned fuel (HC) is supplied to the DOC 21 by the in-pipe injection device 25 or through post-injection, and the temperature of the exhaust gas flowing into the upstream-stage DPF 22 and the downstream-stage DPF 23 is raised to a PM-burning temperature (e.g., approximately 500 degrees C. to 600 degrees C.).

The ECU 50 controls the engine 10, the in-pipe injection device 25, and other components. The ECU 50 includes a CPU, a ROM, a RAM, input ports, and output ports, which are known in the art.

Figure 2:
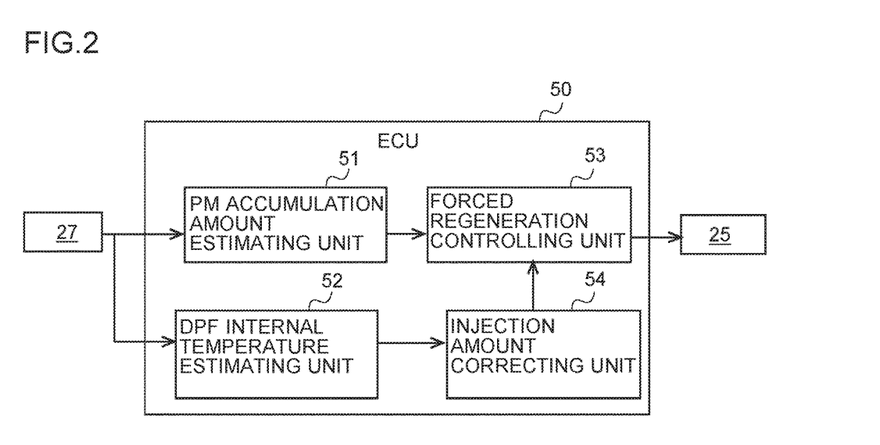
FIG. 2 is a functional block diagram of an ECU according to the embodiment of the present invention.

As illustrated in FIG. 2, the ECU 50 also includes, as some of its function elements, a PM accumulation amount estimating unit 51, a DPF internal temperature estimating unit 52, a forced regeneration controlling unit 53, and an injection amount correcting unit 54. The description continues with a premise that these functional elements are included in the ECU 50, which is an integrated piece of hardware. Alternatively, some of these functional elements may be provided in separate pieces of hardware.

The PM accumulation amount estimating unit 51, which is an example of an accumulation amount estimating unit according to the present invention, estimates an amount of accumulated PM, which is collected by the downstream-stage DPF 23, (hereinafter referred to as "downstream-stage accumulation amount $PM_{DW\ DEP}$") on the basis of an electrostatic capacity (capacitance) C between the electrodes 27 provided in the upstream-stage DPF 22. In general, the electrostatic capacity C between the electrodes 27 is expressed by Expression 1, where ε represents the dielectric constant of a medium between the electrodes 27, S represents the area of the electrodes 27, and d represents the distance between the electrodes 27.

$$C = \varepsilon \times \frac{S}{d} \qquad \text{[Expression 1]}$$

In Expression 1, the area S of the electrodes 27 and the distance d therebetween are the constants. As more PM accumulates between the electrodes 27, the dielectric constant E and the distance d change, and so does the electrostatic capacity C. In other words, detecting the electrostatic capacity C between the electrodes 27 enables the amount of accumulated PM collected by the upstream-stage DPF 22 (hereinafter referred to as "upstream-stage accumulation amount $PM_{UP\ DEP}$") to be calculated.

Figure 3:
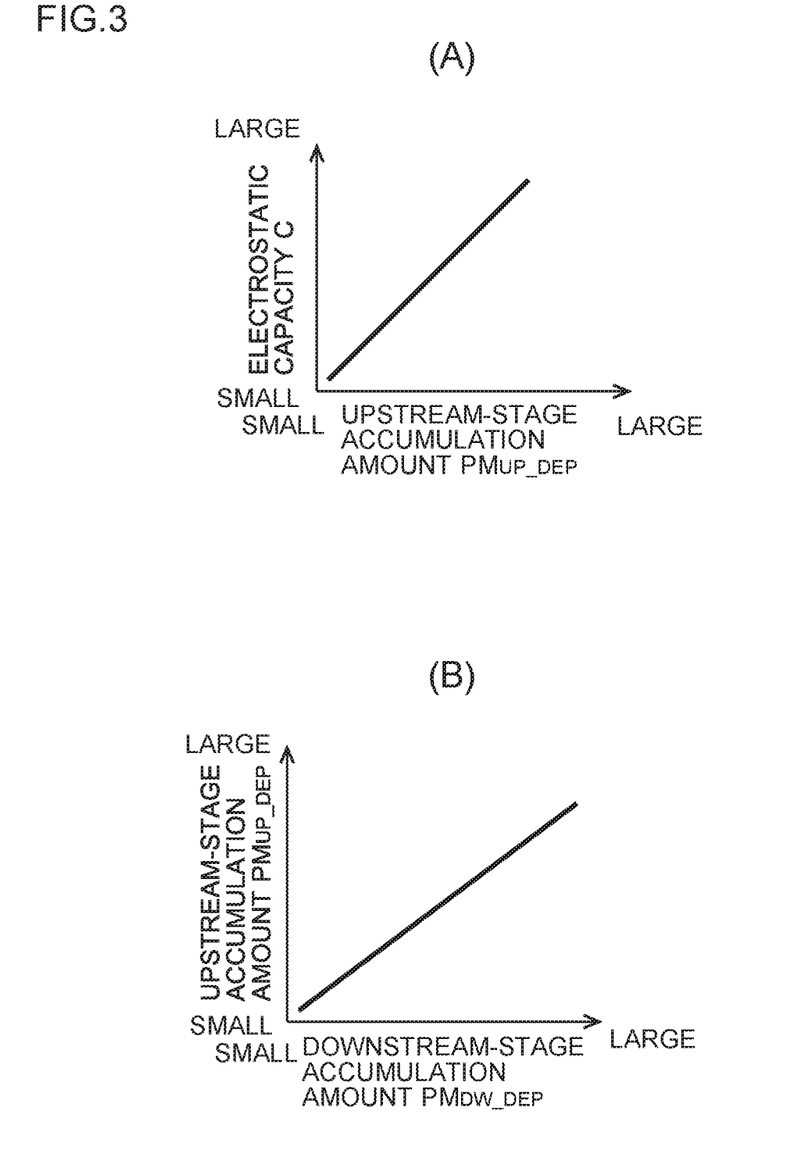
FIG. 3(A) illustrates an example of an upstream-stage accumulation amount map according to the embodiment of the present invention.
FIG. 3(B) illustrates an example of a map of correlation between an upstream-stage accumulation amount and a downstream-stage accumulation amount according to the embodiment of the present invention.

The ECU 50 stores an upstream-stage accumulation amount map (e.g., see FIG. 3(A)) indicating the relation between the electrostatic capacity C between the electrodes 27 and the upstream-stage accumulation amount $PM_{UP\ DEP}$, and also stores a map of correlation between the upstream-stage accumulation amount and a downstream-stage accumulation amount (e.g., see FIG. 3(B)) indicating the relation between the upstream-stage accumulation amount $PM_{UP\ DEP}$ and the downstream-stage accumulation amount $PM_{DW\ DEP}$. These maps are prepared in advance through experiments or the like. The PM accumulation amount estimating unit 51 is configured to estimate the upstream-stage accumulation amount $PM_{UP\ DEP}$ by reading out, from the upstream-stage accumulation amount map, a value corresponding to the electrostatic capacity C between the electrodes 27, and to estimate the downstream-stage accumulation amount $PM_{DW\ DEP}$ by reading out, from the upstream-and-downstream-stage accumulation amount correlation map, a value corresponding to the upstream-stage accumulation amount $PM_{UP\ DEP}$. It should be noted that the upstream-stage accumulation amount $PM_{FR\ DEP}$ and the downstream-stage accumulation amount $PM_{RE\ DEP}$ may be estimated from other than these maps. For example, the upstream-stage accumulation amount $PM_{FR\ DEP}$ and the downstream-stage accumulation amount $PM_{RE\ DEP}$ may be estimated through an approximation formula or the like, which may be prepared in advance through experiments or the like.

The DPF internal temperature estimating unit 52, which is an example of an internal temperature estimating unit according to the present invention, calculates the internal temperature of the upstream-stage DPF 22 (hereinafter referred to as "upstream-stage DPF internal temperature $T_{UP\ DPF}$") on the basis of the electrostatic capacity C between the electrodes 27. In Expression 1, when the dielectric constant E changes as being affected by the exhaust gas temperature, the electrostatic capacity C also changes correspondingly. In other words, detecting the electrostatic capacity C between the electrodes 27 enables the upstream-stage DPF internal temperature $T_{UP\ DPF}$ to be calculated.

The ECU 50 stores a temperature characteristics map (e.g., see FIG. 4) indicating the relation between the electrostatic capacity C and the upstream-stage DPF internal temperature $T_{UP\ DPF}$. The map is prepared in advance by experiments or the like. The DPF internal temperature estimating unit 52 is configured to estimate the upstream-stage DPF internal temperature $T_{UP\ DPF}$ by reading out, from the temperature characteristics map, a value corresponding to the electrostatic capacity C between the electrodes 27. It should be noted that the upstream-stage DPF internal temperature $T_{UP\ DPF}$ may be estimated from other than the map. For example, the upstream-stage DPF internal temperature $T_{UP\ DPF}$ may be estimated through an approximation formula or the like, which may be prepared in advance through experiments or the like.

The forced regeneration controlling unit 53, which is an example of a filter regenerating unit according to the present invention, controls a forced regeneration on the basis of the downstream-stage accumulation amount $PM_{RE\ DEP}$ entered from the PM accumulation amount calculating unit 51. Specifically, the forced regeneration controlling unit 53 starts the forced regeneration by causing the in-pipe injection device 23 to execute in-pipe injection in a predetermined amount when the downstream-stage accumulation amount $PM_{RE\ DEP}$ exceeds an upper limit accumulation amount $PM_{MAX}$ up to which the downstream-stage DPF 23 can collect PM ($PM_{RE\ DEP} > PM_{MAX}$). The amount of in-pipe injection in the forced regeneration is corrected as necessary by the injection amount correcting unit 54, which will be described below.

Figure 5:
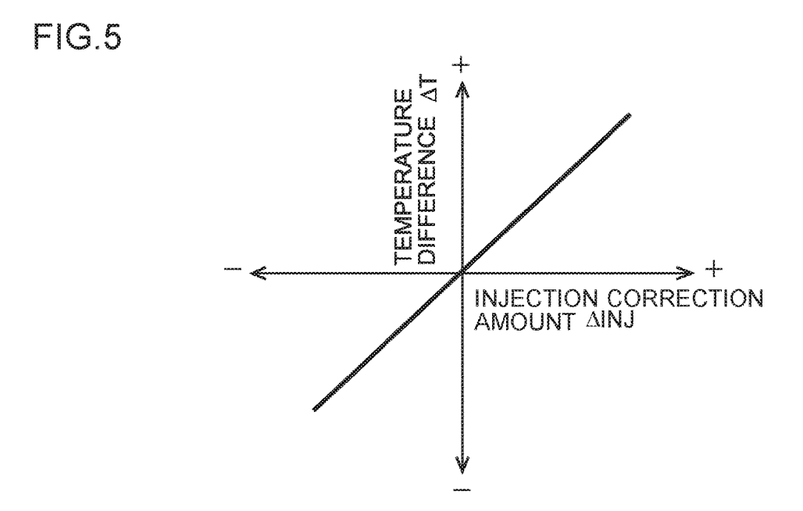
FIG. 5 illustrates an example of an injection amount correction map according to the embodiment of the present invention.

The injection amount correcting unit 54 corrects the fuel injection amount in a forced regeneration on the basis of a temperature difference $\Delta T$ between the upstream-stage DPF internal temperature $T_{FR\ DPF}$, which is entered from the DPF internal temperature estimating unit 52, and a target temperature $T_{TARGT}$ at which the PM in the downstream-stage DPF 23 is substantially completely burned and removed. Specifically, the ECU 50 stores an injection amount correction map (e.g., see FIG. 5) indicating the relation between the temperature difference $\Delta T$ and an injection correction amount $\Delta INJ$ needed to compensate for the temperature difference $\Delta T$. The injection amount correction map is prepared in advance by experiments or the like. The in-pipe injection amount $INJ_{Q\ exh}$ in a forced regeneration is set by reading out, from the injection amount correction map, an injection correction amount $\Delta INJ$ corresponding to the temperature difference $\Delta T$ and by adding the read-out injection correction amount $\Delta INJ$ or subtracting the read-out injection correction amount $\Delta INJ$ to or from a standard injection amount $INJ_{Q\ std}$ ($INJ_{Q\ exh} = INJ_{Q\ std} +/- \Delta INJ$). The fuel injection after the correction is executed by increasing or reducing the conducting pulse duration of each injection applied to an injector of the in-pipe injection device 25 or by increasing or reducing the frequency of injections.

Figure 6:
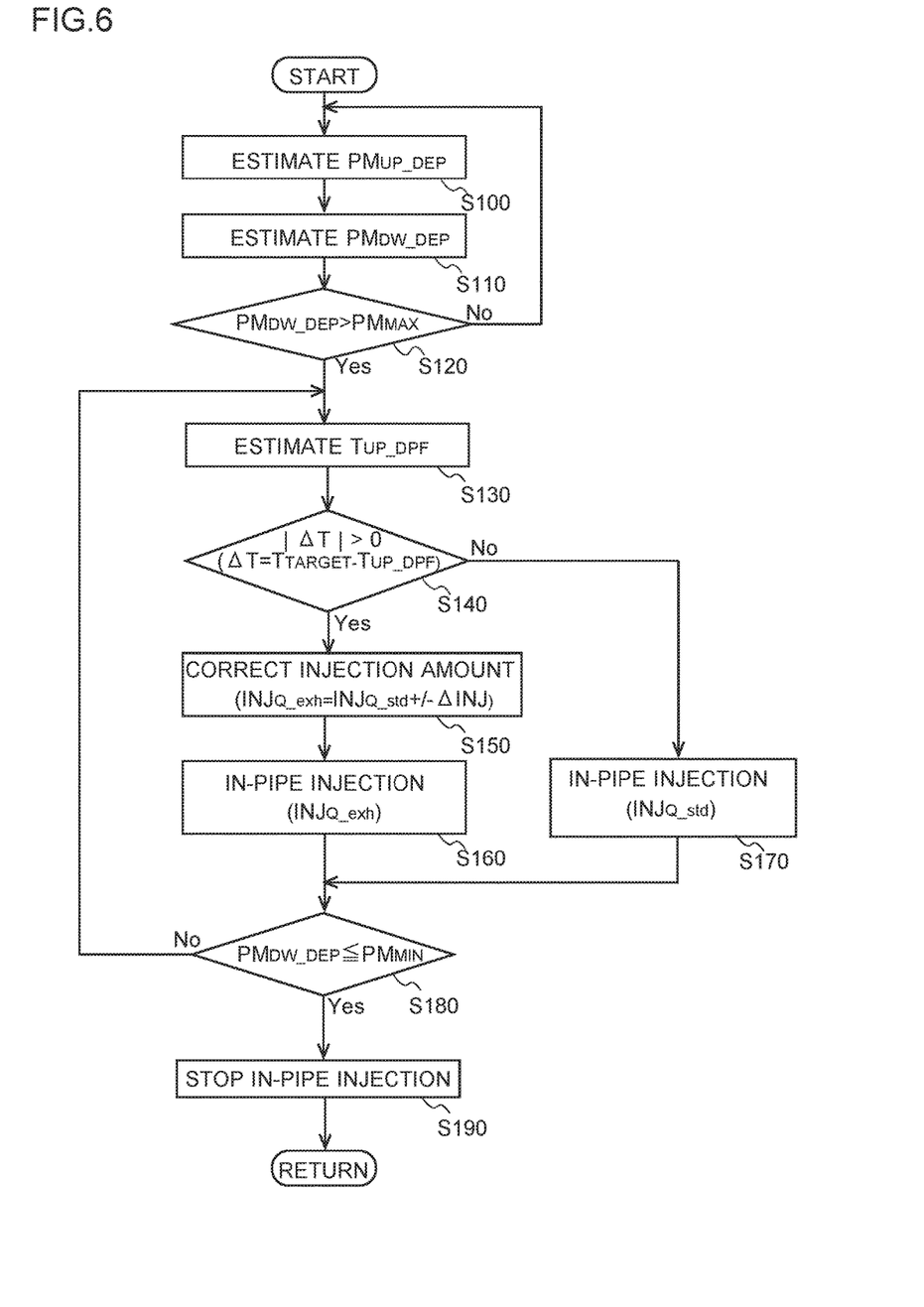
FIG. 6 is a flowchart illustrating contents of control according to the embodiment of the present invention.

Referring now to FIG. 6, a control process of the exhaust purification system of this embodiment will be described. This control starts when an ignition key is turned on. /

In Step 100 (hereinafter, the term "step" is abbreviated as "S"), the upstream-stage accumulation amount $PM_{up\ DEP}$ in the upstream-stage DPF 22 corresponding to the electrostatic capacity C between the electrodes 27 is read out from the upstream-stage accumulation amount map (see FIG. 3(A)). In S110, the downstream-stage accumulation amount $PM_{DW\ DEP}$ in the downstream-stage DPF 23 corresponding to the upstream-stage accumulation amount $PM_{UP\ DEP}$ in S100 is read out from the upstream-and-downstream-stage accumulation amount correlation map (see FIG. 3(B)).

In S120, it is determined whether the downstream-stage accumulation amount $PM_{DW\ DEP}$ has exceeded the upper limit accumulation amount $PM_{MAX}$. If the downstream-stage accumulation amount $PM_{DW\ DEP}$ has exceeded the upper limit accumulation amount $PM_{MAX}$ (Yes), the processing proceeds to S130 to start a forced regeneration.

Figure 4:
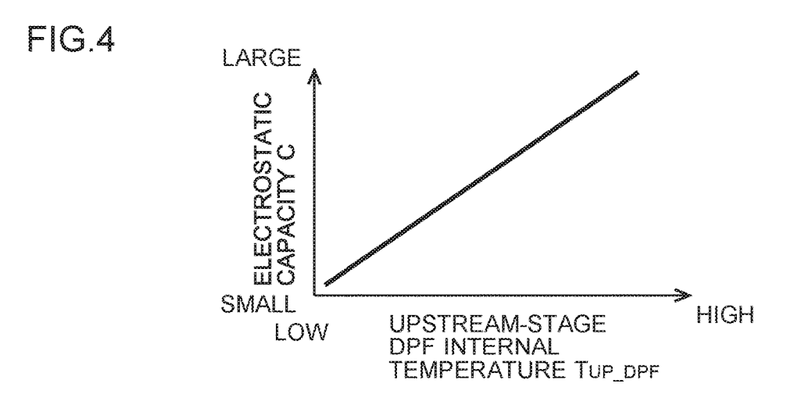
FIG. 4 illustrates an example of a temperature characteristics map according to the embodiment of the present invention.

In S130, the upstream-stage DPF internal temperature $T_{UP\ DPF}$ corresponding to the electrostatic capacity C between the electrodes 27 is read out from the temperature characteristics map (see FIG. 4). In S140, the upstream-stage DPF internal temperature $T_{UP\ DPF}$ is compared to the target temperature $T_{TARGT}$. If the temperature difference $\Delta T$ (absolute value) between the target temperature $T_{TARGT}$ and the upstream-stage DPF internal temperature $T_{up\ DPF}$ is greater than 0 (Yes), the processing proceeds to S150. On the other hand, if the temperature difference $\Delta T$ is 0 (No), the upstream-stage DPF internal temperature $T_{FR\ DPF}$ can be raised to the target temperature $T_{TARGT}$ even if the in-pipe injection is executed in the standard injection amount $INJ_{Q\ std}$. In this case, the processing proceeds to S170, and the in-pipe injection is executed in the standard injection amount $INJ_{Q\ std}$.

In S150, the injection amount is corrected by adding the injection correction amount $\Delta INJ$, which is read out from the injection amount correction map in accordance with the temperature difference $\Delta T$, or subtracting the injection correction amount $\Delta INJ$ to or from the standard injection amount $INJ_{Q\ std}$ ($INJ_{Q\ exh} = INJ_{Q\ std} +/- \Delta INJ$). In S160, the in-pipe injection is executed on the basis of the corrected in-pipe injection amount $INJ_{Q\ exh}$.

In S180, it is determined whether the downstream-stage accumulation amount $PM_{DW\ DEP}$ has decreased to a lower threshold $PM_{MIN}$. The lower threshold $PM_{MIN}$ indicates the end of the regeneration of the downstream-stage DPF 23. If the downstream-stage accumulation amount $PM_{DW\ DEP}$ has decreased to the lower threshold $PM_{MIN}$ (Yes), the in-pipe injection is stopped in S190, and this control proceeds to "Return." Thereafter, S100 to S190 are iterated until the ignition key is turned off.

Effects of the exhaust purification system of this embodiment will now be described.

Conventionally, the technique of estimating an amount of accumulated PM with a differential pressure sensor encounters an issue that the sensitivity drops particularly in a low load operation range in which the flow rate of the exhaust gas decreases or toward the end of a forced regeneration. In contrast, the exhaust purification system of this embodiment estimates the downstream-stage accumulation amount $PM_{RE\ DEP}$ in the downstream-stage DPF 23 on the basis of the electrostatic capacity C between the electrodes 27 provided in the upstream-stage DPF 22 for measurement. In other words, an amount of accumulated PM in the downstream-stage DPF 23 is estimated with high accuracy on the basis of the electrostatic capacity C between the electrodes 27 that has good sensitivity even in the low load operation range or toward the end of a forced regeneration.

Accordingly, the exhaust purification system of this embodiment enables the amount of accumulated PM to be estimated with high accuracy without being affected by the running condition of a vehicle or the like. Since the electrodes 27 are provided in the measurement-dedicated upstream-stage DPF 22, the dimensions or the arrangement of the electrodes 27 need not be set individually in accordance with the shapes, the pitch, or the like of the cells in the downstream-stage DPF 23. Thus, it is possible to flexibly cope with the specifications of the like of the downstream-stage DPF 23.

Figure 7:
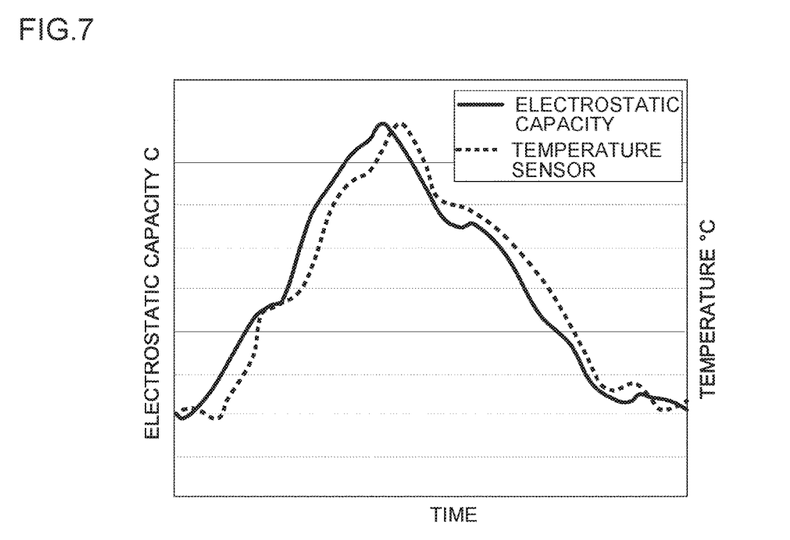
FIG. 7 illustrates a graph comparing the electrostatic capacity between electrodes to a sensor value of an exhaust gas temperature sensor.

Typically, the electrostatic capacity C between the electrodes 27 has characteristics of responding more quickly to a change in the exhaust gas temperature than the sensor value of the exhaust gas temperature sensor does, as illustrated in FIG. 7. In other words, the use of the electrostatic capacity C between the electrodes 27 disposed in the measurement-dedicated DPF 22 makes it possible to detect the internal temperature accurately, as compared with the use of the sensor value of the exhaust temperature sensor(s) provided across the DPFs 22 and 23.

In the exhaust purification system of this embodiment, the in-pipe injection amount (or the post-injection amount) in a forced regeneration is corrected (adjusted) on the basis of the temperature difference $\Delta T$ between the target temperature $T_{TARGT}$ and the upstream-stage DPF internal temperature $T_{FR\ DPF}$, which is calculated from the electrostatic capacity C between the electrodes 27. In other words, as compared to the conventional technique of correcting the injection amount with the use of the sensor value of the exhaust gas temperature sensor, the in-pipe injection amount in the forced regeneration can be optimized by this embodiment because the upstream-stage DPF internal temperature $T_{FR\ DPF}$ is accurately detected.

Accordingly, the exhaust purification system of this embodiment enables the fuel injection amount in the forced regeneration to be controlled with accuracy and can thus effectively improve the regeneration efficiency of the downstream-stage DPF 23. In addition, an exhaust gas temperature sensor does not need to be provided across the upstream-stage DPF 22, and an exhaust gas temperature sensor(s) do(es) not need to be provided across the downstream-stage DPF 23. Therefore, the cost and the size of the overall apparatus can be effectively reduced.

It should be noted that the present invention is not limited to the above-described embodiment, and can be implemented with modifications, as appropriate, within the scope that does not depart from the spirit of the present invention.

For example, it suffices that the number of pairs of the electrodes 27 is at least one, and the illustrated embodiment is not limiting in this regard. The engine 10 is not limited to a diesel engine, and an embodiment can be applied widely to other internal combustion engines including a gasoline engine.

Figure 8:
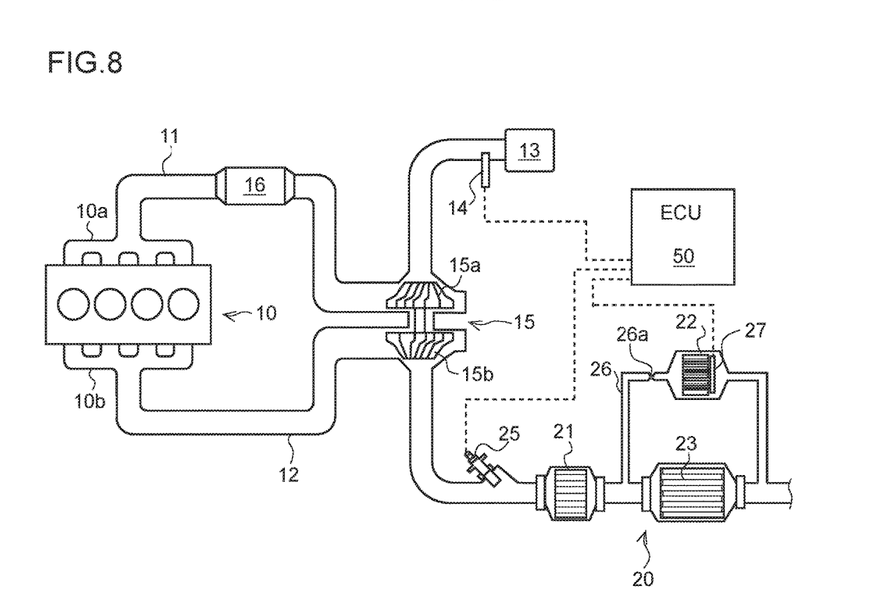
FIG. 8 is an overall configuration diagram schematically illustrating an exhaust purification system of an internal combustion engine according to another embodiment of the present invention.

As illustrated in FIG. 8, a bypass passage 26 may be connected to the exhaust passage 12 so as to bypass the DPF 23, and the DPF 22 for measurement may be disposed in the bypass passage 26. In this configuration, an orifice 26a (restriction) for regulating the flow rate of the exhaust gas is preferably provided in the bypass passage 26 at a position upstream from the DPF 22. When a forced regeneration of the DPF 22 is executed, a voltage may be applied to the electrodes 27 to cause the electrodes 27 to function as a heater.

The invention claimed is:

1. An exhaust purification system, comprising:
an oxidation catalyst provided in an exhaust passage of an internal combustion engine;
a pair of first and second filters provided in the exhaust passage at positions downstream of the oxidation catalyst to collect particulate matter contained in exhaust gas;
electrodes to detect an electrostatic capacity of the first filter; and
an electronic controller configured to
estimate an amount of accumulated particulate matter at least in the second filter based on the detected electrostatic capacity;
execute a forced regeneration to burn and remove the particulate matter that has accumulated at least in the second filter by injecting fuel to the oxidation catalyst when the estimated amount of accumulated particulate matter exceeds a predetermined amount;
estimate an internal temperature of the first filter based on the detected electrostatic capacity; and
correct a fuel injection amount for the forced regeneration based on a temperature difference between a filter target temperature in a forced regeneration and the estimated internal temperature.

2. The exhaust purification system according to claim 1, wherein the electrodes comprise at least one pair of electrodes disposed so as to face each other with at least one partition wall interposed therebetween in the first filter to form a capacitor.

3. An exhaust purification system, comprising:
an oxidation catalyst provided in an exhaust passage of an internal combustion engine;
a pair of first and second filters provided in the exhaust passage at positions downstream of the oxidation catalyst to collect particulate matter contained in exhaust gas;
electrodes to detect an electrostatic capacity of the first filter; and
an electronic controller configured to
estimate an amount of accumulated particulate matter at least in the second filter based on the detected electrostatic capacity;
execute a forced regeneration to burn and remove the particulate matter that has accumulated at least in the second filter by injecting fuel to the oxidation catalyst when the estimated amount of accumulated particulate matter exceeds a predetermined amount,
estimate an internal temperature of the first filter based on the detected electrostatic capacity; and
correct a fuel injection amount for the forced regeneration based on a temperature difference between a filter target temperature in a forced regeneration and the estimated internal temperature,
wherein the first filter and the second filter are disposed in series in the exhaust passage along an exhaust gas flowing direction, wherein the first filter includes a first diesel particulate filter and has a first length in the exhaust gas flowing direction, wherein the second filter includes a second diesel particulate filter and a second length in the exhaust gas flowing direction, and wherein the first length of the first filter is shorter than the second length of the second filter.

4. An exhaust purification system comprising:

an oxidation catalyst provided in an exhaust passage of an internal combustion engine;

a pair of first and second filters provided in the exhaust passage at positions downstream of the oxidation catalyst to collect particulate matter contained in exhaust gas;

electrodes to detect an electrostatic capacity of the first filter;

an electronic controller configured to
- estimate an amount of accumulated particulate matter at least in the second filter based on the detected electrostatic capacity; and
- execute a forced regeneration to burn and remove the particulate matter that has accumulated at least in the second filter by injecting fuel to the oxidation catalyst when the estimated amount of accumulated particulate matter exceeds a predetermined amount; and a bypass passage that branches off from the exhaust passage at a position downstream of the oxidation catalyst so as to bypass the second filter, wherein the first filter is disposed in the bypass passage, wherein the electrodes are located between the first filter and the second filter.

* * * * *